United States Patent
Kawamoto (10) Patent No.: US 6,695,086 B2
(45) Date of Patent: Feb. 24, 2004

(54) DIFFERENTIAL LIMITING APPARATUS FOR ALL-TERRAIN VEHICLE

(75) Inventor: Yuichi Kawamoto, Akashi (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 0 days.

(21) Appl. No.: 10/003,080

(22) Filed: Dec. 6, 2001

(65) Prior Publication Data

US 2002/0070067 A1 Jun. 13, 2002

(30) Foreign Application Priority Data

Dec. 12, 2000 (JP) ......................................... 2000-377281

(51) Int. Cl.[7] .............................................. F16H 48/30
(52) U.S. Cl. ...................... 180/197; 192/99 R; 475/237; 475/239
(58) Field of Search ................................ 475/231, 235, 475/237, 238, 239; 192/99 R, 82 R; 74/491, 502.2; 180/197

(56) References Cited

U.S. PATENT DOCUMENTS

| | | | | |
|---|---|---|---|---|
| 1,723,901 A | * | 8/1929 | Todd | |
| 2,559,944 A | * | 7/1951 | Chapp | 74/710.5 |
| 2,725,761 A | * | 12/1955 | DiPetto | 74/650 |
| 3,215,000 A | * | 11/1965 | Senkowski | 180/336 |
| 4,043,224 A | * | 8/1977 | Quick | 74/710.5 |
| 4,555,962 A | * | 12/1985 | Bucarelli | 74/710.5 |
| 4,934,213 A | * | 6/1990 | Niizawa | 475/86 |
| 4,950,214 A | * | 8/1990 | Botterill | 475/231 |
| 5,092,825 A | * | 3/1992 | Goscenski | 475/150 |
| 5,605,213 A | * | 2/1997 | White | 180/247 |

FOREIGN PATENT DOCUMENTS

| | | | |
|---|---|---|---|
| JP | 53-45832 | 4/1978 | |
| JP | 58-170225 | 11/1983 | |
| JP | 59-20730 | * 2/1984 | .......... B60K/17/04 |
| JP | 61-178231 | 8/1986 | |
| JP | 61-180047 | 8/1986 | |
| JP | 62-52520 | 4/1987 | |
| JP | 62-234732 | 10/1987 | |
| JP | 63-131830 | 8/1988 | |
| JP | 7-242191 | 9/1995 | |
| JP | 8-119177 | 5/1996 | |
| JP | 8-318888 | 12/1996 | |
| JP | 9-177942 | 7/1997 | |

* cited by examiner

Primary Examiner—Daniel G. DePumpo
(74) Attorney, Agent, or Firm—Oliff & Berridge, PLC (57) ABSTRACT

A differential limiting mechanism produces a changeable differential limiting torque. A differential limiting mechanism operating lever is disposed so as to be operated and turned by a hand gripping a handgrip attached to a handlebar. The operating lever is interlocked with the differential limiting mechanism so that the differential limiting torque varies according to an angle through which the operating lever is turned. A lever stopping mechanism stops the operating lever at an angular position for producing a predetermined maximum differential limiting torque.

6 Claims, 8 Drawing Sheets

DIFFERENTIAL LIMITING APPARATUS FOR ALL-TERRAIN VEHICLE

BACKGROUND OF THE INVENTION

1. Field of the Invention

The present invention relates to a differential limiting apparatus for a differential included in an all-terrain vehicle.

2. Description of the Related Art

A vehicle with a differential is provided with a differential locking device as a differential limiting apparatus in order to limit the difference in angular speed between the two output shafts of the differential. The differential locking device interlocks the two output shafts by a dog interlocking system or a spline interlocking system.

Figure 9:
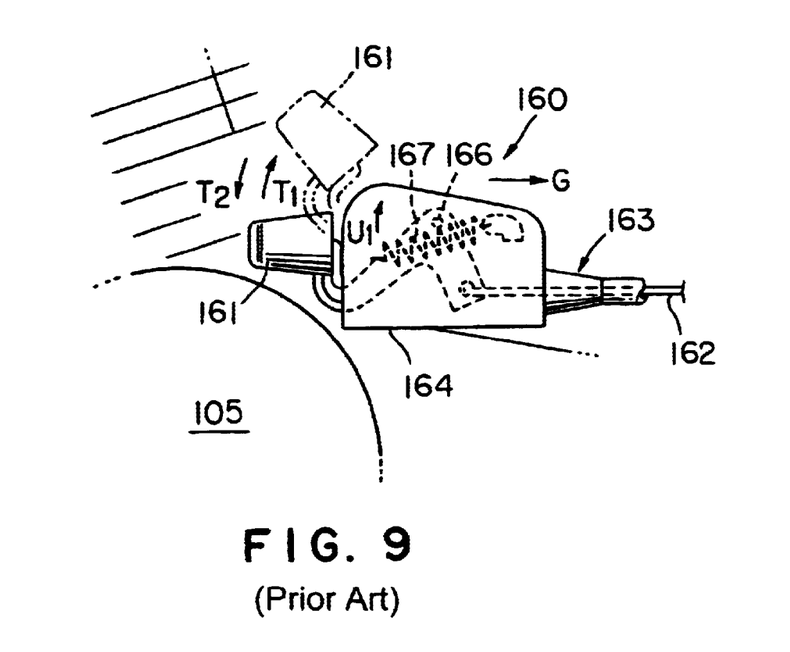
FIG. 9 is a side elevation of a conventional operating mechanism for operating a conventional differential locking mechanism.

A conventional straddle-type four-wheeled all-terrain vehicle is provided with a differential locking device of the dog interlocking system operated by a differential locking device operating mechanism disposed at a position beside an engine and near the rider's foot. Referring to FIG. 9 showing the conventional differential locking device operating mechanism 160 for operating the differential locking device of the dog interlocking system, a differential locking case 164 supporting a differential locking lever 161 is disposed beside the engine 105. The differential locking lever 161 is turned in the direction of the arrow $T_2$ from an unlocking position indicated by imaginary lines to a locking position indicated by continuous lines to slacken a differential locking device operating cable 162 so that the differential is locked. The differential locking lever 161 is biased in the direction of the arrow G by a return spring 167. The return spring 167 turns between positions on the opposite sides of a pivot 166 supporting the differential locking lever 161 across the pivot 166, so that the differential locking lever 161 can be held at either the locking position or the unlocking position.

Another all-terrain vehicle is provided with a differential limiting apparatus capable of producing a differential limiting torque by using, for example, coned disk springs.

The differential locking device of the dog interlocking system is capable of only locking or unlocking the differential regardless of the difference between loads on the right and the left wheel of the all-terrain vehicle and is incapable of operationally adjusting the magnitude of differential limiting torque while the vehicle is traveling. A locking operation for locking the differential by the differential locking device takes much time to engage the dogs of the differential locking device.

The differential locking device operating mechanism 160 disposed at the position beside the engine 105 and near the rider's foot requires the rider to remove a hand from a handgrip attached to a handlebar and to operate the differential locking lever 161 disposed at the rider's foot in a slightly bent position. Thus, the rider is unable to remain in a riding position for a moment and to perform the differential locking operation quickly.

The aforesaid differential limiting apparatus provided with the coned disk springs for continuously producing a fixed differential limiting torque has a fixed differential limiting torque transmitting capacity and is incapable of varying the differential limiting torque according to the condition of travel or turning of the all-terrain vehicle while the all-terrain vehicle is traveling.

SUMMARY OF THE INVENTION

Accordingly, it is an object of the present invention to provide a differential limiting apparatus for an all-terrain vehicle capable of producing a desired differential limiting torque according to the difference in load between right and left wheels of the all-terrain vehicle even while the all-terrain vehicle is traveling, of enabling a rider to perform a differential torque changing operation in an ordinary riding position, and of maintaining a predetermined maximum differential limiting torque.

According to the present invention, a differential limiting apparatus for a differential of an all-terrain vehicle, comprises: a differential limiting mechanism of producing a changeable differential limiting torque, a differential limiting mechanism operating lever disposed so as to be operated and turned by a hand gripping a handgrip attached to a handlebar of the all-terrain vehicle and interlocked with the differential limiting mechanism so that the differential limiting torque varies according to an angle through which the differential limiting mechanism operating lever is turned; and a lever stopping mechanism for stopping the differential limiting mechanism operating lever at an angular position for producing a predetermined maximum differential limiting torque.

A rider riding the all-terrain vehicle is able to produce a desired differential limiting torque without removing the hand from the handgrip. The differential limiting lever turned to the angular position for producing the predetermined maximum differential limiting torque can be stopped at the same angular position to maintain the predetermined maximum differential limiting torque. The interference of the differential limiting mechanism operating lever with the handgrip and the handlebar can be prevented.

Preferably, the lever stopping mechanism includes a projection formed integrally with the differential limiting mechanism operating lever, and a stopping surface formed on a lever holder by which the differential limiting mechanism operating lever is held on the handlebar. The stopping surface comes to engage with the projection to stop the differential limiting mechanism operating lever at the angular position for producing the predetermined maximum differential limiting torque.

The operating lever mechanism can be readily mounted on the handlebar.

Preferably, the differential limiting mechanism operating lever is supported on the lever holder which also supports a brake lever of the all-terrain vehicle.

Increase in the number of parts of the all-terrain vehicle by the equipment of the differential limiting apparatus can be limited to the least necessary extent and assembling work can be simplified.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

Figure 1:
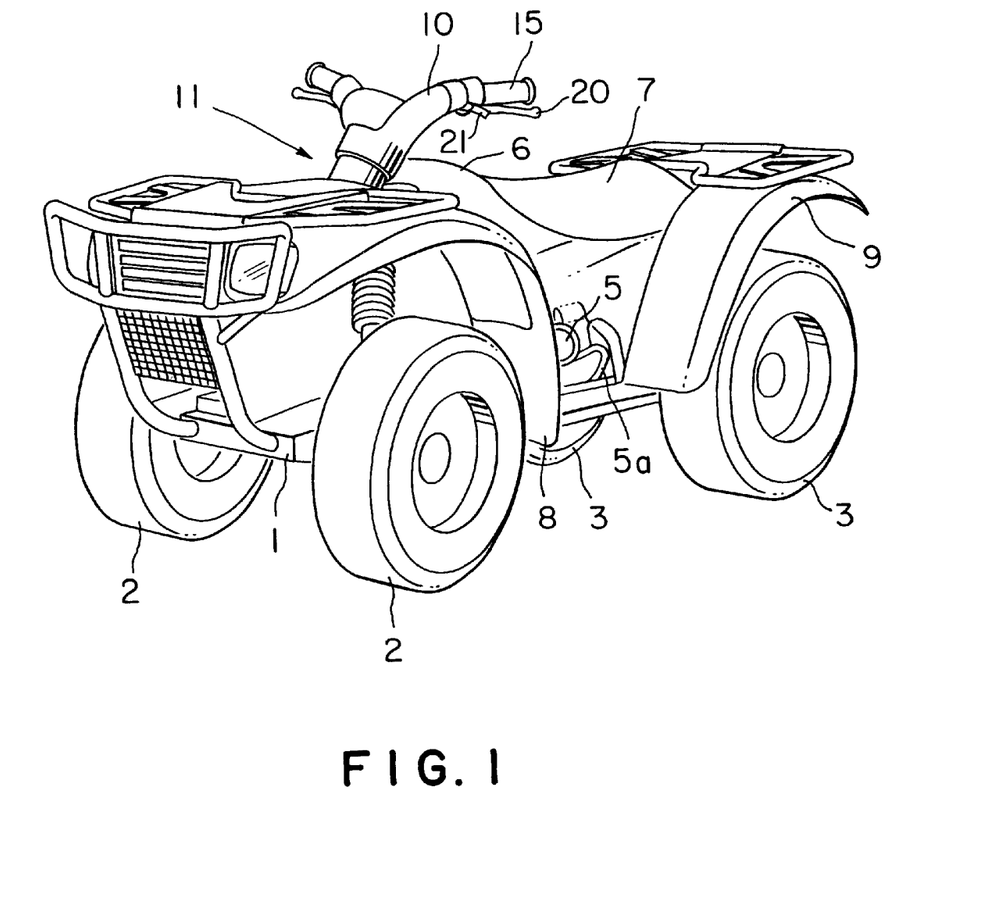
FIG. 1 is a perspective view of an all-terrain vehicle as a preferred embodiment according to the present invention.

Referring to FIG. 1 showing a straddle-type four-wheeled all-terrain vehicle, right and left front wheels 2 are suspended from a front part of a body frame 1, right and left rear wheels 3 are suspended from a rear part of the body frame 1, and an engine 5 and a transmission 5a are mounted in a middle part of the body frame 1. A handlebar 10 is supported on an upper part of the all-terrain vehicle, and a fuel tank 6 and a saddle-type seat 7 are disposed in an upper part of the all-terrain vehicle. A handgrip 15 is put on one end of the handlebar 10, and operating levers including a brake lever 20 and a differential limiting lever 21 are arranged around the handgrip 15.

Figure 2:
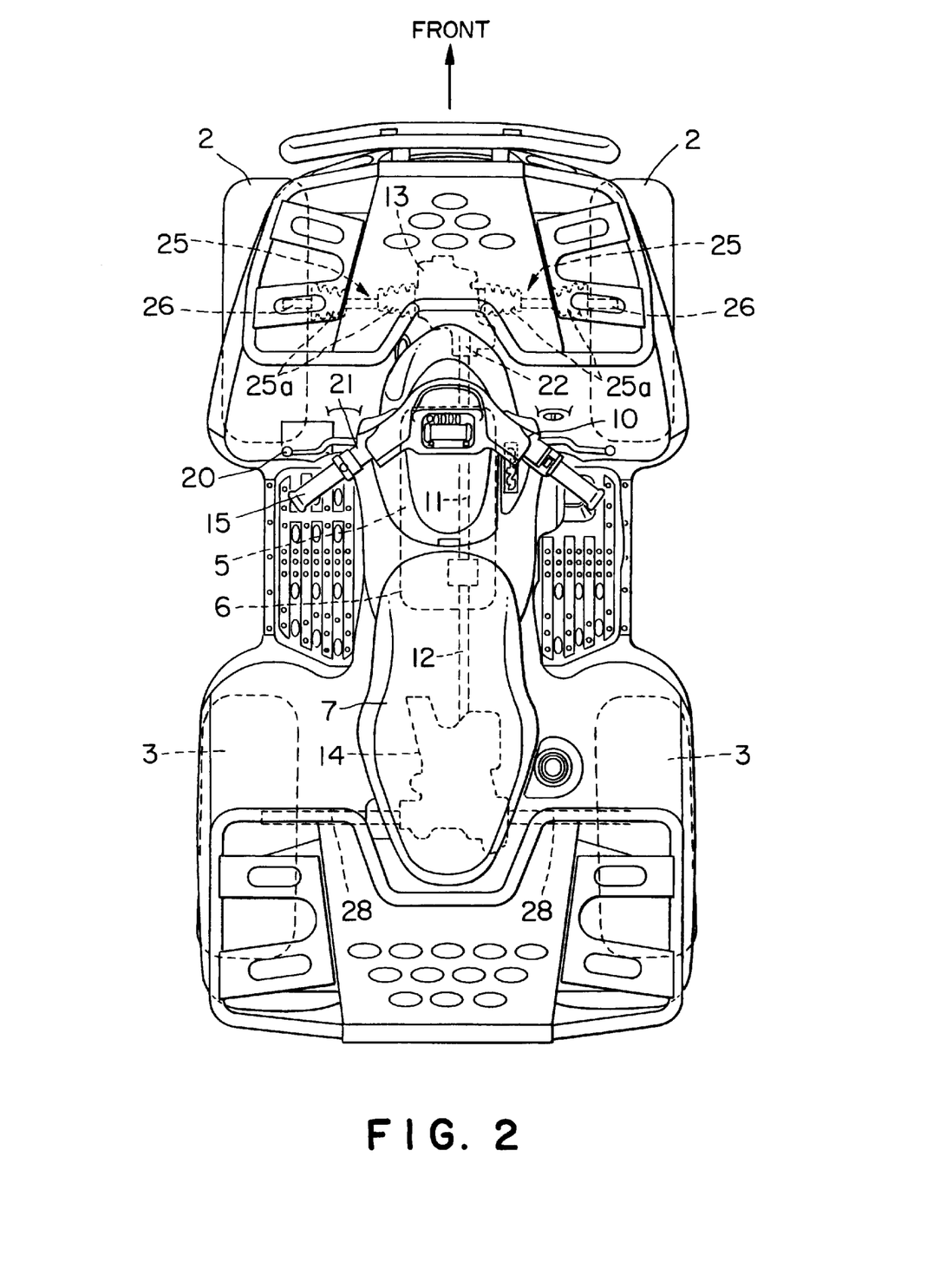
FIG. 2 is a plan view of the all-terrain vehicle shown in FIG. 1.

Referring to FIG. 2 showing the all-terrain vehicle in a plan view, a front propeller shaft 11 for driving the front wheels 2, and a rear propeller shaft 12 for driving the rear wheels 3 are extended coaxially under the engine 5 and the transmission 5a. The propeller shafts 11 and 12 are connected to output shafts included in the transmission 5a and are driven by the engine 5 through a power transmission mechanism including a gear transmission mechanism included in the transmission 5a and a variable-speed V-belt drive. The front propeller shaft 11 extends forward and is connected to an input shaft 22 included in a front reduction gear having a front reduction gear case 13. The rear propeller shaft 12 extends rearward and is connected to an input shaft included in a rear reduction gear having a rear reduction gear case 14.

Right and left front drive shafts 25 provided with ball-and-socket joints 25a at their opposite ends extend laterally from the right and the left side of the front reduction gear case 13 and are connected to right and left front axles 26. Rear axles 28 project laterally from the right and the left side of the rear reduction gear case 14.

Figure 3:
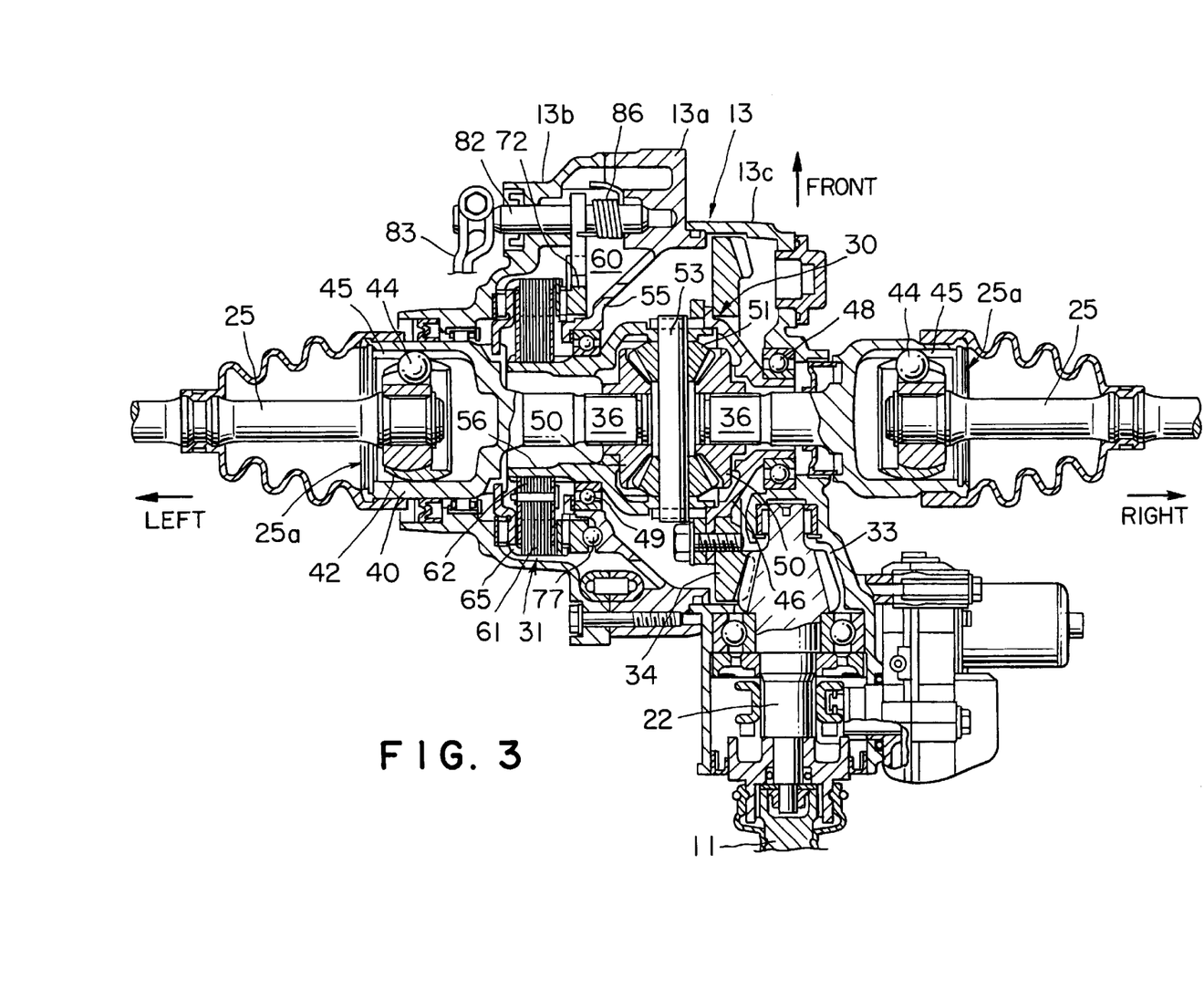
FIG. 3 is an enlarged, longitudinal sectional view of a front reduction gear of the all-terrain vehicle shown in FIGS. 1 and 2.

Referring to FIG. 3 showing the front reduction gear having the front reduction gear case 13 in an enlarged longitudinal sectional view, the front reduction gear case 13 is divided into three parts, i.e., a central segment 13a, a right segment 13c and a left segment 13b. A differential gear mechanism 30 is held in the front reduction gear case 13. A wet multiple disk differential limiting mechanism 31 is disposed on the left side of the differential gear mechanism 30 in the front reduction gear case 13. A pinion 33 formed integrally with the input shaft 22 is disposed on the right side of the differential gear mechanism 30 in the front reduction gear case 13. The pinion 33 is engaged with a reduction large gear 34 fastened to the outer circumference of a differential case 46 included in the differential gear mechanism 30.

The right and the left front drive shaft 25 are connected to right and left differential gear shafts 36 by ball-and-socket joints 25a, respectively. Each of the ball-and-socket joint 25a comprises a socket 40 internally provided with grooves 45, a ball retainer 42 placed in the socket 40, and balls (steel balls) 44 retained on the ball retainer 42 and engaged in the grooves 45 of the socket 40. The front axle 26 is connected to the front drive shaft 25 by the ball-and-socket point 25a.

Basically, the differential gear mechanism 30 shown in FIG. 3 is the same as a generally known differential gear mechanism. The differential gear mechanism 30 comprises the differential case 46, right and left differential side gears 50 supported in the differential case 46, differential pinions 51 engaged with the differential side gears 50 and having axes perpendicular to those of the differential side gears 50. The differential side gears 50 are mounted on and interlocked with splined inner end parts of differential gear shafts 36. The differential pinions 51 are supported rotatably on a support shaft 53 fixedly supported on the differential case 46 and having an axis perpendicular to the axes of the differential gear shafts 36.

A right end part of the differential case 46 is supported in a bearing 48 on the right segment 13c of the front reduction gear case 13 for rotation relative to the right segment 13c. A left end part of the differential case 46 is supported in a bearing 49 on a middle wall 55 formed integrally with the central segment 13a of the front reduction gear case 13 for rotation relative to the central segment 13a. A hub 56 is formed integrally with and extend to the left from the left end part of the differential case 46. The hub 56 serves as a support for supporting annular metal plates 62 included in the wet multiple disk differential limiting mechanism 31.

The wet multiple disk differential limiting mechanism 31 is disposed in a chamber 60 defined by the left segment 13b and the middle wall 55. The chamber 60 communicates with the interior of the front reduction gear case 13 supporting the differential case 46 therein and contains a predetermined quantity of lubricating oil.

Figure 4:
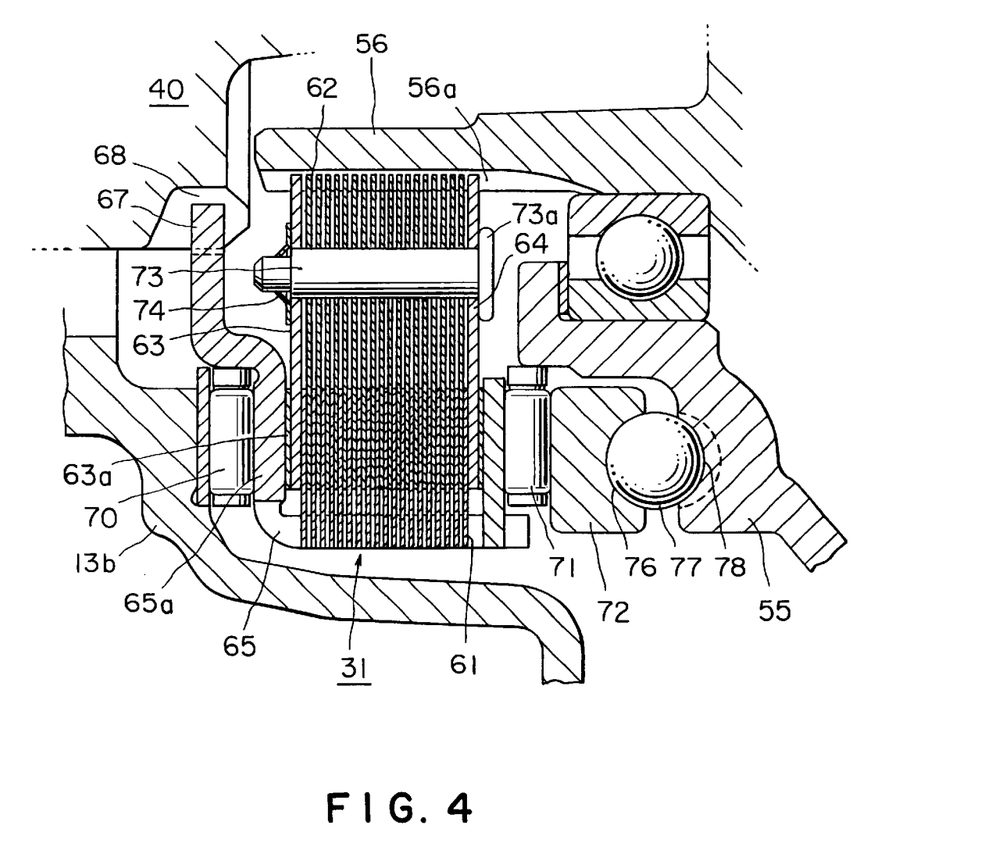
FIG. 4 is an enlarged, longitudinal, half sectional view of a differential limiting mechanism included in a differential limiting apparatus as a preferred embodiment according to the present invention.

Referring to FIG. 4 showing the differential limiting mechanism 31 included in the differential limiting apparatus embodying the present invention in an enlarged, longitudinal, half sectional view, a plurality of annular friction plates 61 and the plurality of annular metal plates 62 are arranged alternately between annular pressure plates 63 and 64. The inner circumferential ends of the annular metal plates 62 are engaged with external splines 56a of the hub 56 so that the annular metal plates 62 are able to move axially. The outer circumferential ends of the annular friction plates 61 are engaged with axial grooves of the tubular housing 65 so that the annular friction plates 61 are able to move axially.

The housing 65 is provided at its left end with an annular end wall 65a provided with teeth 67 in its inner circumference. The teeth 67 are engaged with teeth 68 formed in the outer surface of the socket 40. Thus, the housing 65 and the socket 40 are interlocked for rotation together with each other. A needle bearing 70 is interposed between the left end surface of the end wall 65a and the inner side surface of the left segment 13b of the front reduction gear case 13. The right end surface of the end wall 65a can be pressed against a friction pad 63a attached to the left side surface of the left pressure plate 63.

Pins 73 are extended in the left-and-right direction through holes formed in the pressure plates 63 and 64, friction plates 61 and the metal plates 62. A maximum interval between the pressure plates 63 and 64 is determined by a head 73a formed at one end part of the pin 73 and a snap ring 74 put on the other end part of the pin 73. A small initial differential limiting torque, such as "0", can be set by setting the pressure plates 63 and 64 at a long interval.

A rotating annular pressing cam plate 72 is disposed on the right side of the right pressure plate 64 and a needle bearing 71 is disposed between the right pressure plate 64 and the pressing cam plate 72. Six cam grooves 76 are formed in the right end surface of the cam plate 72. Semispherical recesses 78 are formed in a surface facing the cam plate 72 of the middle wall 55 at positions respectively corresponding to the six cam grooves 76. Balls (steel balls) 77 held rotatably in the recesses 78 engage in the cam grooves 76, respectively.

Figure 5:
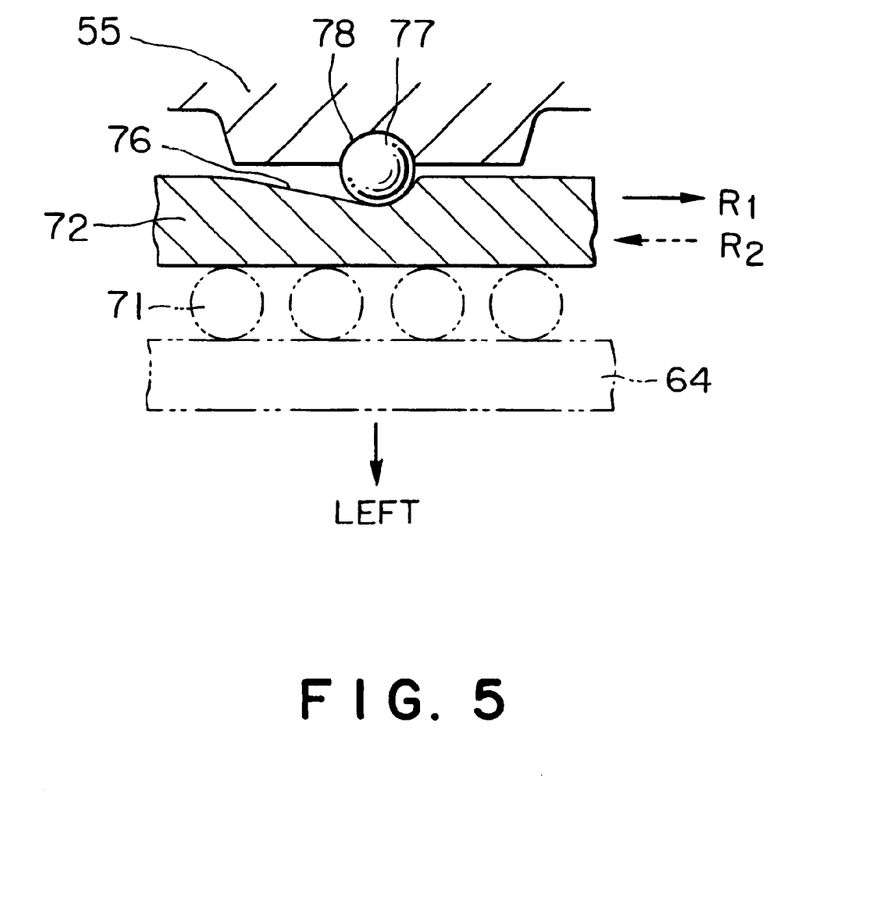
FIG. 5 is an enlarged, fragmentary, sectional view of a cam plate taken on line V—V in FIG. 6.
Figure 6:
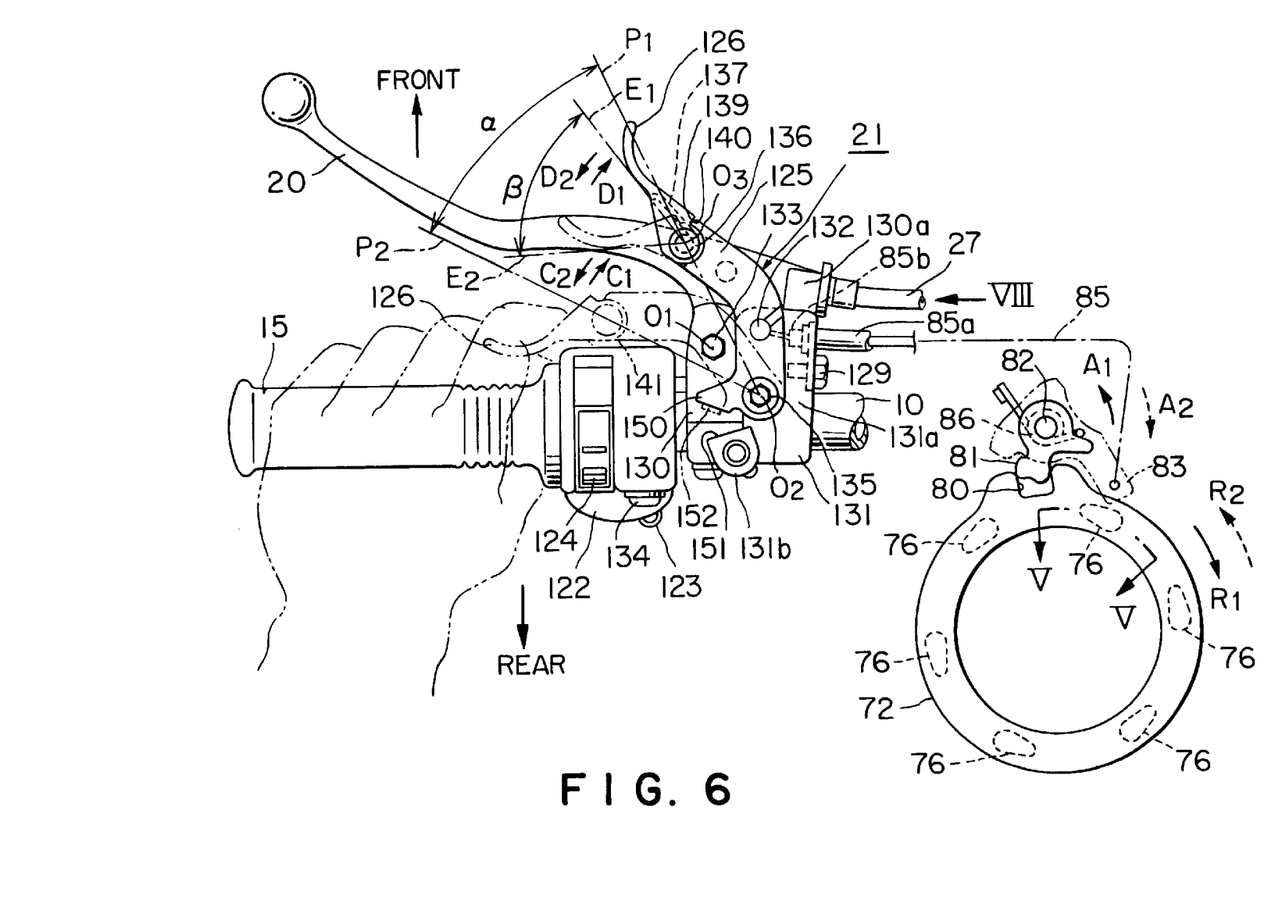
FIG. 6 is a plan view of a differential limiting lever and a brake lever shown in combination with a side elevation of the cam plate.

FIG. 5 is an enlarged, fragmentary, sectional view of a cam plate taken on line V—V in FIG. 6, showing one of the cam grooves 76 and one of the balls 77. The cam groove 76 has an inclined bottom surface having a depth gradually decreasing in the direction of the arrow $R_2$. When the cam plate 72 is turned in the direction of the arrow $R_1$ relative to the balls 77, the cam plate 72 pushes the right pressure plate 64 to the left as viewed in FIG. 4 through the needle bearing 71. Thus, the differential limiting torque increases when the cam plate 72 is turned in the direction of the arrow $R_1$ and decreases when the cam plate 72 is turned in the direction of the arrow $R_2$.

FIG. 6 is a plan view of the differential limiting lever 21 shown in combination with a side elevation of the cam plate 72. FIG. 6 shows an operating force transmitting path between the differential limiting lever 21 and the cam plate 72. The six cam grooves 76 are arranged at equal angular intervals. An operating lever 81 is fixed to one end part of a shaft 82, is engaged in a recess 80 formed in the outer circumference of the cam plate 72 and is biased in the direction of the arrow $A_2$, i.e., a differential limiting torque reducing direction, by a torsion coil spring 86. An outer lever 83 is fixed to the other end part of the shaft 82 and is connected to the differential limiting lever 21 by a differential limiting mechanism operating cable 85 sheathed in a sheath 85a.

Figure 8:
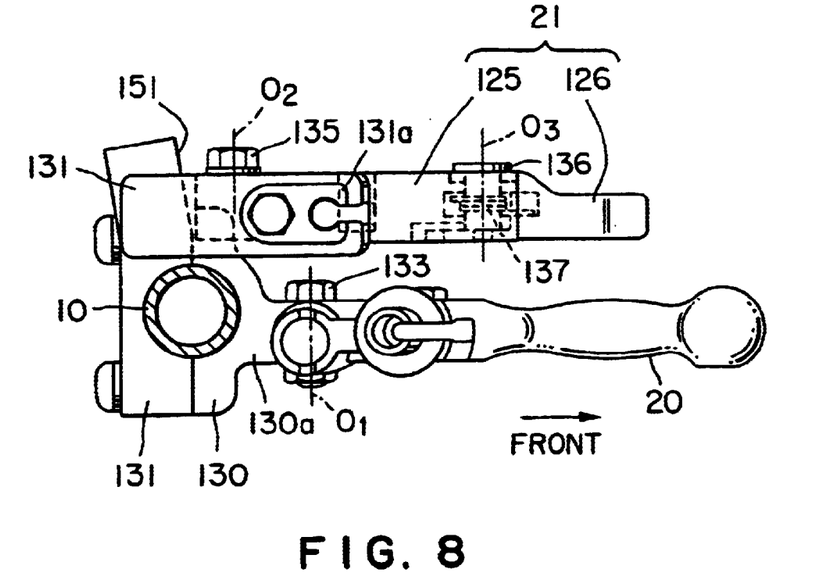
FIG. 8 is a view of the brake lever and the differential limiting lever taken in the direction of the arrow VIII in FIG. 6.

The brake lever 20 and the differential limiting lever 21 will be described with reference to FIG. 8, which is a view taken in the direction of the arrow VIII in FIG. 6. A front lever holder 130 and a rear lever holder 131 are fastened together so as to clamp the handlebar 10. The front lever holder 130 extends forward. The brake lever 20 is supported by a bolt 133 on the front lever holder 130 for turning about the axis $O_1$ of the bolt 133. The rear lever holder 131 extends forward over the front lever holder 130. A bolt 135 parallel to the bolt 133 on the rear lever holder 131 supports a base end part of the differential limiting lever 21.

Referring to FIG. 6, the lever holders 130 and 131 are disposed on the side of the center axis of the all-terrain vehicle with respect to the handgrip 15. A switch box 122 is disposed between the lever holders 130, 131 and the handgrip 15. A choke lever 123, a light switch 124 and a horn button 134 are held on the switch box 122.

The brake lever 20 extends toward the free end of the handgrip 15 in a region in which the brake lever 20 can be operated by the driver's hand gripping the handgrip 15. A brake cable 27 is connected to a base end part of the brake lever 20.

The differential limiting lever 21 has a length about half that of the brake lever 20 and is disposed above the brake lever 20. The differential limiting lever 21 has a main lever 125 supported for turning on the bolt 135, and an auxiliary lever 126 pivotally supported by a joint pin 136 on a free end part of the main lever 125. The auxiliary lever 126 is able to turn relative to the main lever 125. The free end of the differential limiting mechanism operating cable 85 is engaged in a groove 132 formed in the main lever 125. The free end of the sheath 85a covering the differential limiting mechanism operating cable 85 is set to a front projection 131a projecting forward from the rear lever holder 131. A stop bolt 129 is screwed in the front projection 131a.

The main lever 125 can be turned through an operating angle α between a minimum differential limiting torque producing position (releasing position) $P_1$ indicated by continuous lines and a maximum differential limiting torque producing position $P_2$ indicated by imaginary lines for producing a predetermined maximum differential limiting torque. The main lever 125 can be retained at the maximum differential limiting torque producing position $P_2$ by a retaining mechanism including a projection 150 formed integrally with the main lever 125 so as to project to the left from the base end part of the main lever 125, and a tubular projection 131b formed integrally with the rear lever holder 131 and a stopping surface 151 facing the projection 150.

The auxiliary lever 126 can be turned on the axis $O_3$ of the joint pin 136 through an angle β between a waiting position $E_1$ indicated by continuous lines spaced forward from the grip 15 and an operating position $E_2$ indicated by imaginary lines. A return spring 137 wound around the joint pin 136 biases the auxiliary lever 126 in the direction of the arrow $D_1$ toward the waiting position $E_1$. When the auxiliary lever 126 is located at the waiting position $E_1$, an end edge 139 of the auxiliary lever 126 is in contact with an end edge 140 of the main lever 125. When the auxiliary lever 126 is located at the operating position $E_2$, another end edge 141 of the auxiliary lever 126 is in contact with the main lever 125, and hence the auxiliary lever 126 can be turned together with the main lever 125 in the direction of the arrow $C_2$. When located at the waiting position $E_1$, the auxiliary lever 126 is apart forward from the brake lever 20. When located at the operating position $E_2$, the auxiliary lever 126 lies substantially right above the brake lever 20.

The magnitude of resilience of the return spring 137 is lower than a reaction force exerted on the differential limiting mechanism operating cable 85 by the differential limiting mechanism. Therefore, when a finger is put on the auxiliary lever 126 and the auxiliary lever 126 is turned in the direction of the arrow $D_2$, first the auxiliary lever 126 is turned about the axis $O_3$ of the joint pin 136 to the operating position $E_2$, and then the auxiliary lever 126 and the main lever 125 turns together about the axis $O_2$ of the bolt 135 in the direction of the arrow $C_2$ to the maximum differential limiting torque producing position $P_2$.

Next, operations of the present embodiment will be explained.

[Non-Operation State]

When the differential limiting apparatus is not operated, the main lever 125 is held at the minimum differential limiting torque producing position $P_1$ and the auxiliary lever 126 is held at the waiting position $E_1$ by the return spring 137 as indicated by continuous lines in FIG. 6. In this state, the auxiliary lever 126 is spaced forward from a space over the brake lever 20 and a space in front of the brake lever 20 is available for operating the brake lever 20. Thus the brake lever 20 can be operated without hindrance.

When the main lever 125 is held at the minimum differential limiting torque producing position $P_1$, the operating lever 81 is biased in the direction of the arrow $A_2$ by the coil spring 86 and hence the cam plate 72 is biased in the direction of the arrow $R_2$. Consequently, the balls 77 are located in the deepest parts of the cam grooves 76, respectively, as shown in FIG. 5, the cam plate 72 is retracted to the right, and any pressure is not applied to the pressure plate 64. Thus, the differential limiting mechanism 31 is in a minimum differential limiting torque transmitting state, in which a minimum differential limiting torque is transmitted from the metal plates 62 to the friction plates 61 by the agency of the viscosity of the oil filing up spaces between the metal plates 62 and the friction plates 61. If the minimum differential limiting torque is set to zero, any differential limiting torque is not transmitted at all.

[Differential Limiting Operation]

Referring to FIG. 6, a finger is put on the auxiliary lever 126 held at the waiting position $E_1$, and the auxiliary lever 126 is turned in the direction of the arrow $D_2$ against the resilient force of the return spring 137. As a first step, only the auxiliary lever 126 is turned about the axis $O_3$ to the operating position $E_2$ with respect to the main lever 125.

As a second step, the auxiliary lever 126 in the operating position $E_2$ is turned together with the main lever 125 in the direction of the arrow $C_2$ to pull the differential limiting mechanism operating cable 85, differential limiting torque increases gradually as the differential limiting mechanism operating cable 85 is pulled. Thus, the cam plate 72 is turned in the direction of the arrow $R_1$, i.e., differential limiting torque increasing direction, through the differential limiting mechanism operating cable 85, the outer lever 83, the shaft 82 and the operating lever 81. Consequently, the cam plate 72 is forced to push the right pressure plate 64 to the left by the cam action of the cam grooves 76 and the balls 77 (FIGS. 4 and 5) to compress the friction plates 61 and the metal plates 62 between the pressure plates 63 and 64. Thus, a differential limiting torque proportional to the turning angle of the differential limiting lever 21 is produced.

[Maximum Differential Limiting Torque Operation]

Figure 7:
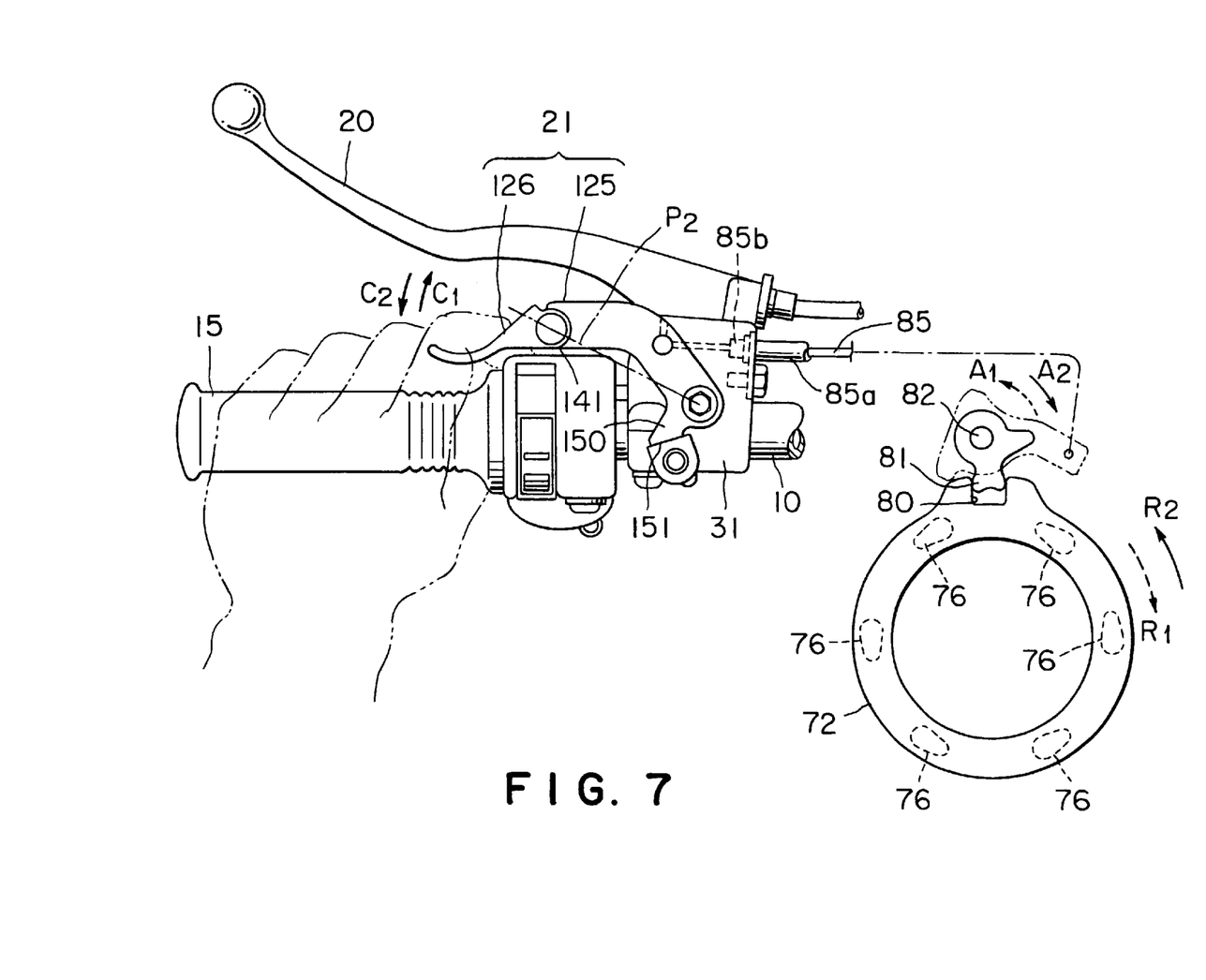
FIG. 7 is a plan view of the differential limiting lever and the brake lever, similar to FIG. 6, in a state for producing a predetermined maximum differential limiting torque.

When the differential limiting lever 21 is turned to the maximum differential limiting torque producing position $P_2$ as shown in FIG. 7, the projection 150 of the differential limiting lever 21 comes into contact with the stopping surface 151 and the maximum differential limiting torque is produced. The rider holds the differential limiting lever 21 at the maximum differential limiting torque producing position $P_2$ to maintain the predetermined maximum differential limiting torque.

The maximum differential torque is adjusted by adjusting the position of an adjusting bolt 85b connected to the sheath 85a. An adjusting bolt 152 indicated by imaginary lines in FIG. 6 may be screwed in the projection 150 of the differential limiting lever 21 so as to face the stopping surface 151 and the maximum differential limiting torque may be adjusted by adjusting the length of part of the adjusting bolt 152 projecting from the projection 150 of the differential limiting lever 21 to adjust the maximum differential limiting torque producing position $P_2$.

[Differential Limiting Torque Release Operation]

When the finger is removed from the auxiliary lever 126 in the state shown in FIG. 7, the main lever 125 is turned automatically in the direction of the arrow $C_1$ by a reaction force exerted thereon through the differential limiting mechanism operating cable 85 to the minimum differential limiting torque producing position $P_1$, and the auxiliary lever 126 is turned automatically by the return spring 137 in the direction of the arrow $D_1$ and is returned to the waiting position $E_1$. At the same time, the shaft 82 is turned in the direction of the arrow $A_2$ and the cam plate 72 is turned in the direction of the arrow $R_2$ to reduce the differential limiting torque to the minimum differential limiting torque.

[Operation of Differential Gear Mechanism]

The basic operation of the differential gear mechanism 30 is the same as that of a well-known differential gear mechanism. As shown in FIG. 3, the rotation of the front propeller shaft 11 is transmitted through the input shaft 22, the pinion 33 and the gear 34 to the differential case 46 of the differential gear mechanism 30. The rotation of the differential case 46 is transmitted through the support shaft 53, differential pinions 51 and the differential side gears 50, and the right and the left differential gear shaft 36 to the right and the left front drive shaft 25. While the right and the left front wheel 2 (FIG. 2) are loaded substantially equally, the right and the left front wheel 2 rotates at the same rotating speed. When the right and the left front wheel 2 are loaded greatly unequally when the all-terrain vehicle is traveling, for example, along a curve, the differential pinions 51 rotate for a differential motion.

In the embodiment described above, the differential limiting mechanism operating lever 21 is disposed beside the brake lever 20 for operating a rear brake, supported on a left end part of the handlebar 10. The differential limiting mechanism operating lever 21 may be disposed beside a brake lever for operating a front brake, supported on a right end part of the handlebar 10.

In the embodiment described above, the resilient force of the return spring 137 is determined such that the main lever 125 starts turning after the auxiliary lever 126 has been turned to the operating position $E_2$, the resilient strength of the return spring 137 may be determined such that the main lever 125 is turned for an initial stroke before the auxiliary lever 126 is turned to the operating position $E_2$, and then the auxiliary lever 126 turns to the operating position $E_2$.

In the embodiment described above, the differential limiting mechanism operating lever 21 is a composite lever formed by pivotally joining the main lever 125 and the auxiliary lever 126. The differential limiting mechanism operating lever 21 may be a single lever.

Although the invention has been described in its preferred embodiment with a certain degree of particularity, obviously many changes and variations are possible therein. It is therefore to be understood that the present invention may be practiced otherwise than as specifically describe herein without departing from the scope and spirit thereof.

What is claimed is:

1. An all-terrain vehicle comprising:

a handlebar;

a handgrip attached to one end of the handlebar;

a brake lever disposed on the one end of the handlebar;

a differential; and a differential limiting apparatus for the differential, including:

a differential limiting mechanism of producing a changeable differential limiting torque, a differential limiting mechanism operating lever disposed near the handgrip and extending substantially parallel to the handgrip so as to be operated and turned by a hand gripping the handgrip and interlocked with the differential limiting mechanism so that the differential limiting torque varies according to an angle through which the differential limiting mechanism operating lever is turned;

a lever holder holding the differential limiting mechanism operating layer so that the differential limiting mechanism operating lever is able to rotate about an axis parallel to a rotational axis of the brake lever, the lever holder being disposed on the handlebar and positioned inward with respect to the handgrip in a direction of a width of the vehicle, and a lever stopping mechanism for stopping the differential limiting mechanism operating lever at an angular position for producing a predetermined maximum differential limiting torque.

2. The all-terrain vehicle according to claim 1, wherein the lever stopping mechanism includes a projection formed integrally with the differential limiting mechanism operating lever, and a stopping surface formed on the lever holder, and wherein the stopping surface comes to engage with the projection to stop the differential limiting mechanism operating lever at the angular position for producing the predetermined maximum differential limiting torque.

3. The all-terrain vehicle according to claim 1, wherein the brake lever is supported by the lever holder which also supports the differential limiting mechanism operating lever.

4. The all-terrain vehicle according to claim 3, wherein the differential limiting mechanism operating lever has a length shorter than a length of the brake lever.

5. The all-terrain vehicle according to claim 4, wherein a distal end of the differential limiting mechanism operating lever is located at a position farther away from the handgrip in comparison to the brake lever when the differential limiting mechanism operating lever is not operated.

6. The all-terrain vehicle according to claim 5, wherein the differential limiting mechanism operating lever comprises a main lever portion having a proximal end rotatably supported on the lever holder and an auxiliary lever portion having a proximal end rotatably supported on a distal end of the main lever, a distal end of the auxiliary lever forming a free end of the differential limiting mechanism operating lever.

* * * * *